2,063,638

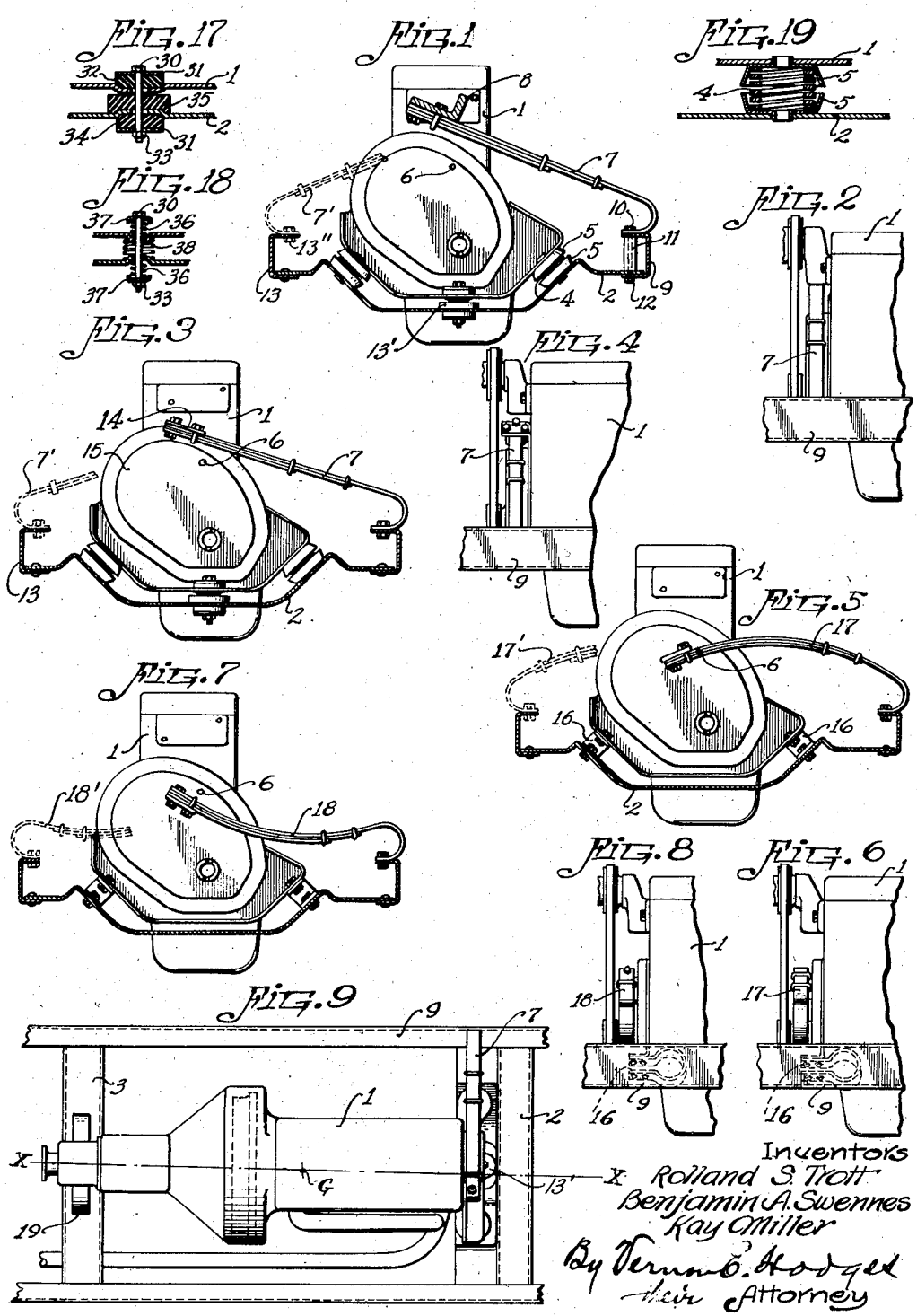
Dec. 8, 1936.  R. S. TROTT ET AL  2,063,638
TORQUE SPRING POWER PLANT MOUNTING
Filed May 27, 1933  2 Sheets-Sheet 1
Inventors
Rolland S. Trott
Benjamin A. Swennes
Kay Miller
By Vernon C. Hodges
their Attorney Dec. 8, 1936.   R. S. TROTT ET AL   2,063,638
TORQUE SPRING POWER PLANT MOUNTING
Filed May 27, 1933   2 Sheets-Sheet 2
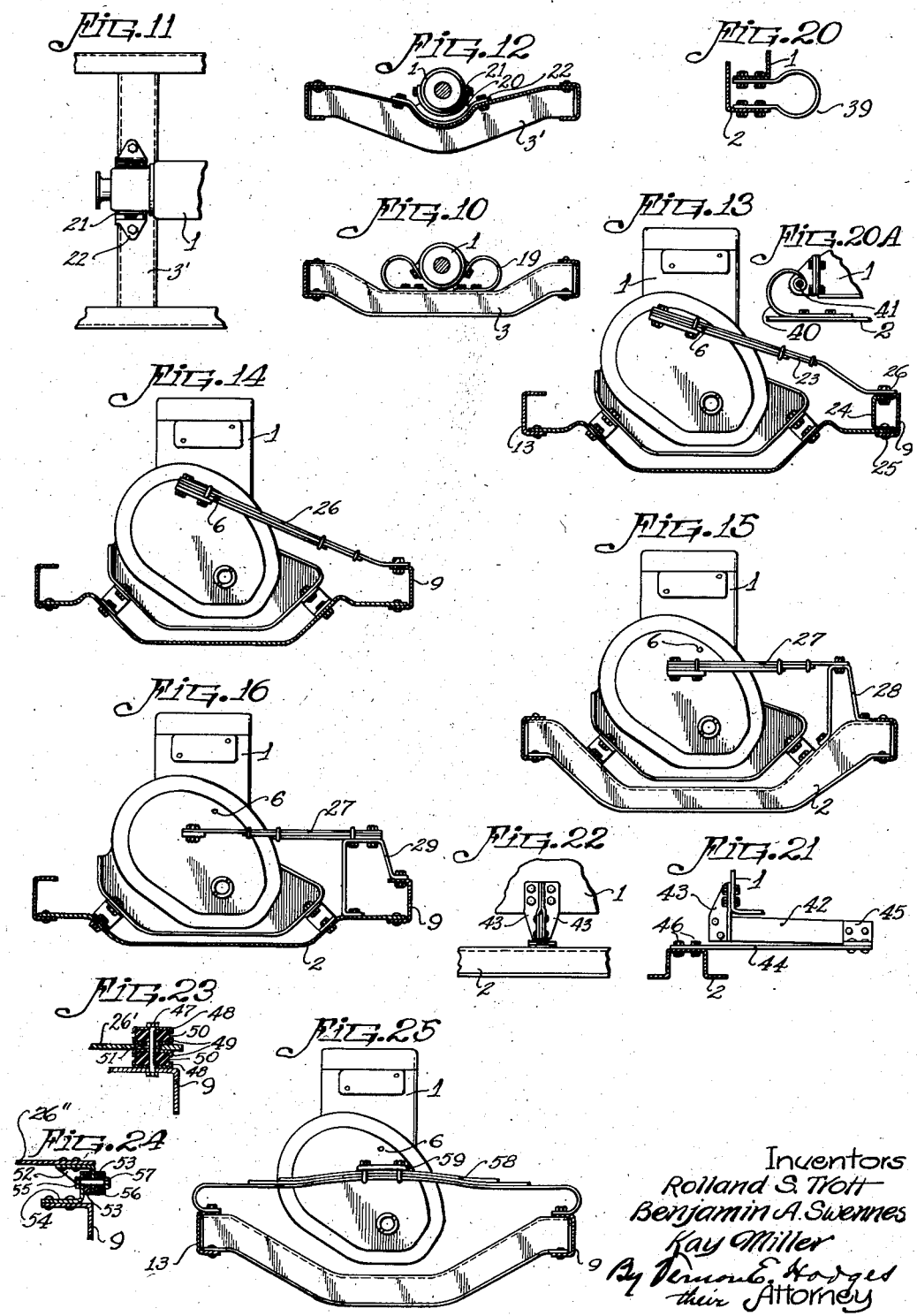
Inventors
Rolland S. Trott
Benjamin A. Swennes
Kay Miller
By Vernon E. Hodges
their Attorney Patented Dec. 8, 1936

UNITED STATES PATENT OFFICE 2,063,638

TORQUE SPRING POWER PLANT MOUNTING

Rolland S. Trott, Denver, Colo., and Benjamin A. Swennes and Kay Miller, Rockford, Ill., said Swennes and said Miller assignors to said Trott Application May 27, 1933, Serial No. 673,288

11 Claims. (Cl. 248—7)

This invention relates to engine mountings for engines having torque and force cushioning movements with respect to their supports and more especially to mountings which will securely hold the engine in place by means of resilient mounting units adjacent the front and rear of the engine unit, and provided with a resilient torque cushioning and resilient locating means mounted at the front, rear or other points of the engine unit and properly secured to the frame or support thereof.

This application was executed at the same time and filed at the same time as our two co-pending and supplementary applications which are entitled respectively, "Clamped C-spring engine mounting" Serial No. 673,290, filed May 27, 1930, and "Eyed C-spring engine mounting", Serial No. 673,289, filed May 27, 1930. These two co-pending inventions, or any part of either or both of them are intended to cooperate with this invention where necessary to produce all the desired characteristics of a proper engine mounting.

It is the object of this invention to provide, in connection with mounting units which afford resiliently opposed transverse and substantially pivotal motion of the engine unit about an axis of oscillation, torque cushioning means which act as a stabilizer and resiliently restrict the torque imposed transverse movement of the engine unit in addition to the resilient restriction due to the said mountings as well as absorbing the oscillatory torque forces set up by the action of the engine unit.

A further object is to provide a torque transmitting connection between the engine and its support which will accomodate itself to the orbital action of the engine unit on its weight supporting cushion mountings, but which will assist said mounting to resiliently limit the transverse component of such orbital movement.

A further object is to provide a method of metallically maintaining the proper position of the axis of oscillation in a "floating engine" construction, and at the same time resiliently resisting torque imposed oscillation, while restricting or preventing the transmission of sound to the support of frame on which the engine unit is mounted.

A further object is to provide such a torque transmitting construction which may be combined to operate in conjunction with any of the constructions disclosed in our co-pending applications on "clamped C-spring or "eyed C-spring" mountings, or rubber or other mountings to provide a complete and satisfactory engine unit mounting.

A further object is to provide a torque transmitting connection between the engine unit and its support, which will, in addition to its peculiar functions of torque cushioning, resiliently restrict the movement of the engine unit upon its cushioned mountings so as to cause the axis of oscillation to remain substantially fixed.

All of this is fully described below and is illustrated in the drawings, in which:—

Figure 1 is a front view of an engine unit showing its front mountings with the addition of our torque spring construction.

Figure 2 is a fragmentary side view of Figure 1.

Figure 3 is another front view of the engine unit showing another position of the torque spring.

Figure 4 is a fragmentary side view of Figure 3.

Figure 5 shows another form of front mounting and of torque spring.

Figure 6 is a fragmentary side view of Figure 5.

Figure 7 is a front view of an engine unit and its mountings showing another type of torque spring.

Figure 8 is a fragmentary side view of Figure 7.

Figure 9 is a plan view of Figure 1 showing an engine unit mounted upon its frame through cushion mountings and our torque spring at the front of the engine unit.

Figure 10 is a view showing one form of rear mounting construction.

Figure 11 is a plan view, showing another form of rear mounting construction.

Figure 12 is a rear view of Figure 11.

Figure 13 is a front view of an engine unit showing another form of our torque spring construction.

Figure 14 is a front view of an engine unit showing another form of our torque spring construction.

Figure 15 is a front view of an engine unit showing another form of our torque spring construction.

Figure 16 is a front view of an engine unit showing another form of our torque spring construction.

Figure 17 is a fragmentary section showing one method of bumper and holddown means construction.

Figure 18 shows another form of bumper and holddown means construction.

Figure 19 is an enlarged section through one of the front mounting springs as shown in Figure 1.

Figure 20 shows another form of mounting spring, as fully described in our co-pending clamped C-spring application.

Figure 20A shows another form of mounting spring as fully described in our co-pending eyed C-spring application.

Figure 21 shows a form of parallel clamped C-spring mounting.

Figure 22 is another view of Figure 21.

Figure 23 is an enlarged section showing one means of construction for resiliently attaching the torque spring to the frame.

Figure 24 shows another means of resiliently attaching the torque spring end to the frame or support.

Figure 25 shows another method of mounting the front of the engine unit.

The construction of these various figures will now be described in detail as follows:—

In Figure 1, the engine unit 1 is mounted upon the coil springs 4, which are located and received in the cups 5, one of which centers in the front plate of the engine unit, and the other in the front frame member 2. The hooked end torque spring 7 is attached to the pad 8, which is located on the engine unit at a point above the center of gravity 6, by means of the bolt and U-bolt construction shown, and is secured to the frame side rail 9 by means of the bolt 10, spacer sleeve 11 and the nut 12. The object of this method of attaching the torque spring end to the side rail is to provide a rigid construction which will decrease the possibility of twisting the side rail 9. The holddown means is shown as at 13' and will be more fully described hereinafter in the description of Figure 17. It will be noted by the fragmentary dotted torque spring portion 7' attached to the side rail 13 by the bolt and nut 13" that the torque spring may go to one frame side rail or another as desired.

Figure 2 shows a side view of Figure 1.

Figure 3 shows a method of mounting the engine unit 1 very similar to that shown in Figure 1, the variation being in the location at which the hooked torque spring is attached to the engine unit 1 and the elimination of the use of the spacer 11, as shown in Figure 1. The seat 14 for the torque spring is integral with the timing gear cover 15 and is located adjacent to and directly above the axis of oscillation 6 at the front of the engine unit. A dotted portion of the torque spring 7' is shown properly attached to the side rail 13 to indicate that the torque spring may be attached to the other side of the frame.

Figure 4 is a fragmentary side view of Figure 3.

Figure 5 shows another form of construction wherein the engine unit 1 is mounted upon the clamped C-springs 16, which are properly attached to the engine unit and to the front frame member 2. The cambered hooked end torque spring 17 is shown in the form of a semi-elliptic spring, and its method of attachment if so disposed as to be located directly on the axis of oscillation 6 at the front of the engine unit. It will be noted that the torque spring may be attached to either side rail as indicated by the fragmentary dotted portion of the torque spring 17'.

Figure 6 shows a side view of Figure 5.

Figure 7 shows a front mounting construction similar to Figure 5, the only variation being in the form of the cambered hooked end torque spring 18 which is semi-elliptic but formed to a reverse camber or ellipse, opposite in direction to that of spring 17 in Figure 5, and attached to the engine unit 1 at a point below the axis of oscillation 6. The fragmentary dotted portion of the torque spring 18' indicates the possibility of attaching the torque spring to one side or the other.

Figure 8 is a side view of Figure 7.

Figure 9 is a plan view showing the engine unit 1 mounted upon the front frame member 2 and upon the rear frame member 3 by the clamped C-springs 19 and with the torque spring 7 at the front of the engine unit and attached to the side rail 9. The axis of oscillation X—X, provided by the engine mountings is shown passing through the center of gravity G.

Figure 10 shows the rear of the engine unit 1 mounted upon the clamped C-springs 19, which are properly clamped to the frame member 3 and to the engine unit 1.

Figures 11 and 12 show the rear of the engine unit 1 mounted on the rubber member 20 which is bonded or otherwise properly secured to the member 21, which is attached to the engine unit 1 and to the portion 22, which is bolted to the frame member 3'.

Figure 13 shows another form of front mounting construction with the offset ended torque spring 23 attached to the engine unit 1 at the axis of oscillation 6 and secured to the frame side rail 9 so as to be rigidly attached thereto. The formed bracket 24 is riveted or otherwise properly attached to the frame side rail 9 at the points 25 and 26 and tends to strengthen the side rail at this point when stresses occur due to the action of the torque spring 23. The torque spring 23 may, if so desired, be mounted upon the other side rail 13 as an alternative construction.

Figure 14 shows another form of torque spring 26 rigidly bolted or otherwise properly attached to the side rail 9 and to the engine unit 1 on the center of gravity 6. In this construction, the spring of the rail 9 is relied upon to provide the required slight transverse movement.

Figure 15 shows a straight form of torque spring 27 attached to the engine unit 1 at a point below the axis of oscillation 6 and to the front frame member 2 by means of the bracket 28, which is relied upon to provide a slight amount of transverse movement.

Figure 16 shows a straight form of torque spring 27 similar to that shown in Figure 15 but with the single leaf end attached to the engine unit 1 at a point below the axis of oscillation 6, and the built-up end of the spring secured to the bracket 29, which in turn rests upon and is secured to the front frame member 2 and the side rail 9. This is an improper construction and is only shown as a possible variation.

It will be noted from Figures 1, 3, 5, 7, 13, 14, 15, and 16 that various forms of torque springs have been used. In some cases it may be desirable to use a straight form of torque spring as shown in Figures 15 and 16, which positively restricts transverse movement of the front of the engine unit except for bracket spring, as mentioned above, so that any transverse movement must come from the amount of flexibility inherent in the construction itself.

In Figures 1, 3, 5, and 7 a loop or hook has been provided at the end of the torque spring where it is attached to the frame side rail so that there will be a slight amount of spring in the loop under the action of the transverse forces set up by the engine unit. Another method of providing flexibility for movement in this direction might be provided by the use of the elliptical form, as shown in Figures 5 and 6, or by a staggered bend or offset, as shown in Figure 13. The resilient opposition to transverse movement of the engine unit is further provided and hereinafter described in connection with Figures 23 and 25.

Figure 17 shows a method of construction for the resilient restriction of the rebound of the engine unit as well as resilient opposition to excessive downward thrust at the front of the engine unit. The bolt 30 passes through the washers 31 and the rubber rebound bumpers 32 and 34 and are held in place by the washers 31 and nut 33. Upon rebound of the engine unit 1 the bumpers 32 and 34 act against the washers 31 and the formed portion of the engine unit 1 and on the bottom of the flange of the front frame member 2. The downward force of the front of the engine unit is cushioned by the rubber bumper 35 between the portion 1 of the engine unit and the top of the flange of the frame member 2. This construction does not offer any opposition to the normal movements of the engine unit with respect to the frame, and proper clearances are provided for freedom thereof, but it is so conceived that when the action of the engine unit, either in a rebound or in a downward direction, goes beyond the normal limits, it will be resiliently but firmly restricted by the above means.

Figure 18 shows another form of rebound and downward cushioning means for the front of the engine unit wherein the springs 36, through the bolt 30, nut 33 and washers 37, serve to resiliently restrict the rebound of the front of the engine unit, and the spring 38 restricts the excessive downward movement of the engine unit.

Figure 19 is an enlarged section showing a coil spring 4 contained in the cups 5, and acting between the engine unit 1 and the front frame member 2.

Figure 20 shows another form of mounting spring 39, known as the "clamped C-spring" type and covered in our co-pending application of even date. The C-spring 39 is properly attached to the engine unit 1 and front frame member 2. Any form of clamped C-spring as set forth in our co-pending clamped C-spring application may be used in conjunction with any form of torque spring as set forth in this application.

Figure 20A shows another form of mounting spring 40, known as the "eyed C-spring" and set forth in our co-pending eyed C-spring application covering this construction, of even date. The eyed C-spring 40 is properly attached to the front frame member 2, and to the engine unit 1, by means of the shackle bolt 41.

Figures 21 and 22 show another form of mounting spring which is constructed of two pieces of flat spring stock which are properly attached as shown. The vertical portion of the spring 42 is attached to the engine unit 1 by means of the brackets 43 and attached to the horizontal portion of the spring 44 by means of the angle brackets 45, which portion 44 is attached to the front frame member 2 by the bolts 46. In this type of spring, the transverse forces set up by the action of the engine unit are resiliently opposed by the vertically disposed spring member 42 and the vertical forces are resiliently opposed by the horizontal spring member 44. It will be seen that any desired proportion of vertical opposition to horizontal opposition can be obtained by variation of the springs 44 and 42.

Figure 23 shows a construction wherein the torque spring 26' is resiliently attached to the frame side rail 9 by means of the cups 49 which are held in place in the holes 51 of the torque spring end 26'' by projections into the hole of the torque spring or by welding or in any other proper manner. The cups 49 receive the rubber insulators 50, which are held in place by the bolt 47 and cupped washers 48 secured to the frame side rail 9.

Figure 24 shows another form of means of resiliently attaching the torque spring end to the frame side rail 9. The stamped bracket 52, properly attached to the torque spring end 26'' rests between the rubber insulators 53, which are held in place by means of the angle bracket 54, bolt 55, washer 56 and nut 57, said bracket being properly attached to the frame side rail 9. The aforementioned resilient torque spring connections may be used with any or all of the torque spring forms mentioned in this application.

Figure 25 shows another form of front mounting wherein the engine unit 1 is mounted upon the transverse built-up leaf spring 58, which rests upon the frame side rails 9 and 13. The transverse spring 58 is attached to the engine unit 1 by the pad 59, which is below the axis of oscillation 6, and to the side rails 9 and 13 either rigidly or by some resilient means, as shown in Figures 23 and 24. This type of spring as shown receives the weight of the engine unit and provides the necessary resilient opposition to torque and other forces of the engine unit within itself, but may also be used in connection with the types of mounting springs previously shown and mentioned and in which case the spring 58 will mainly serve to cushion only the torque forces, both those causing oscillation, and those of a transverse nature which are due to torque reactions.

The other main characteristic of this torque spring case is that in all cases there is at least a slight amount of transverse resilience provided, if not by resilient members, then by the natural spring or give of the frame or other parts of the construction. We have found that unless this transverse resilience is provided, either in the spring itself, or in its connections or mountings, there is a hard sound under some speeds and conditions that is very annoying and that is impossible to eliminate, except by providing some transverse resilience. So, the main duties of this torque spring are to resiliently resist torque cushioning oscillation, and to resiliently resist the transverse resultants of torque reactions, all by means of a construction having enough resilience in necessary directions so as to restrict or prevent the transmission of sound from the engine unit to the support or frame upon which the engine unit is mounted. At the same time, where the engine unit is mounted low with a high axis of oscillation, the connection of the torque spring with the engine unit at a high point enables the torque spring to serve the additional function of resiliently resisting transverse movement to overcome low speed extreme torque thrash.

Having now described our torque spring power plant or engine unit mounting, what we claim as new and desire to protect by Letters Patent is as follows:—

1. In a motor vehicle having an engine unit mounted on a support for force cushioning movement in transverse planes combined with torque cushioning oscillation about a longitudinal axis, a torque stabilizer for said engine unit comprising a member having means fixing the opposite ends thereof to the engine unit and the support and so constructed and arranged as to yield in at least two transverse directions in resiliently opposing the movements of the engine unit.

2. In a motor vehicle having an engine unit mounted therein for transverse force cushioning movement combined with torque cushioning oscillation about a longitudinal axis, stabilizer construction connected between said engine unit and a part of the vehicle other than the engine unit including a leaf-spring having the major portion thereof yieldable in one direction and having a portion yieldable in another direction in resiliently opposing the movements of the engine unit.

3. In a motor vehicle, the combination with an engine unit and a support for said engine unit mounting the engine unit for transverse force cushioning movement combined with torque cushioning oscillation about a longitudinal axis, of stabilizer construction for the engine unit having fixed connection of the ends thereof with the engine unit adjacent the longitudinal axis and with the support of the engine unit, said stabilizer construction having the major portion thereof yieldable in one direction and having another portion thereof yieldable in another direction in resiliently opposing the movements of the engine unit.

4. In a motor vehicle having an engine unit mounted therein for oscillatory movement about a longitudinal axis, the combination with said engine unit, of a stabilizer connected with the engine unit extending transverse thereto and connected to a part of the vehicle other than the engine unit and resiliently opposing said oscillatory movement of the engine unit, said stabilizer having means fixed thereto and yieldable transversely of the engine unit for resisting transverse movement of the engine unit.

5. In a motor vehicle, the combination with an engine unit mounted in the vehicle for torque oscillatory movement about a longitudinal axis, of a torque spring connected with said engine unit and extending transversely thereto resiliently opposing said oscillatory movement of the engine unit, said spring having a looped portion for resisting transverse movement of the engine unit.

6. In a motor vehicle having a frame, an engine unit mounted for oscillation relative to the vehicle, and means extending laterally from the engine unit for stabilizing the oscillatory motion of the engine unit and having fixed connections with the engine unit and frame with the intermediate part yielding to the oscillatory movement of the engine unit and having an intermediate portion yieldable longitudinally of said stabilizing means for absorbing lateral vibrations of said engine unit.

7. In a motor vehicle, the combination with an engine unit, of means mounting said engine unit in the vehicle for oscillation about a longitudinal axis, said mounting means including a front mounting so constructed and arranged as to locate the axis of oscillation a substantial distance therefrom, and resilient means for stabilizing the torque oscillatory motion of the engine unit and connected between the engine unit and a part of the vehicle other than the engine unit, said stabilizing means being connected with the engine unit an appreciable distance above the front mounting.

8. In a motor vehicle, the combination with an engine unit, of means mounting said engine unit in the vehicle for oscillation about a longitudinal axis, said mounting means including a front mounting so constructed and arranged as to locate the axis of oscillation a substantial distance therefrom, and resilient means for stabilizing the torque oscillatory motion of the engine unit and connected between the engine unit and a part of the vehicle other than the engine unit, said stabilizing means being so constructed and arranged as to resiliently resist transverse movement of the engine unit.

9. In a motor vehicle, the combination with an engine unit, of means mounting said engine unit in the vehicle for oscillation about a longitudinal axis, said mounting means including a front mounting so constructed and arranged as to locate the axis of oscillation a substantial distance therefrom, and means for stabilizing the oscillatory motion of the engine unit and connected between the engine unit and a part of the vehicle other than the engine unit, said stabilizing means comprising a leaf spring connected with the engine unit above the mounting means and extending transversely of the engine unit, said leaf spring having a portion thereof yielding to transverse movement of the engine unit.

10. In a motor vehicle, the combination with an engine unit, of means mounting said engine unit in the vehicle for oscillation about a longitudinal axis extending through the entire length of the engine unit, said mounting means including a front mounting so constructed and arranged as to locate the axis of oscillation a substantial distance above the same, and a stabilizing spring connected between the engine unit and a part of the vehicle other than the engine unit to resiliently oppose oscillatory movement of the engine unit, said spring extending laterally from the engine unit and connected therewith above the mounting means and having a portion thereof yielding to transverse movement of the engine unit for resiliently locating the axis against extreme low speed torque thrash.

11. In a motor vehicle, the combination with an engine unit, of means mounting said engine unit in the vehicle for oscillation about a longitudinal axis extending lengthwise approximately through the entire length of the engine unit and inclined above the engine crankshaft at the front of the engine unit, said mounting means including a front mounting structure located below the engine crankshaft, and resilient means for stabilizing the torque oscillatory motion of the engine unit and connected between the engine unit and a part of the vehicle other than the engine unit, said stabilizing means being connected with the engine unit adjacent the axis of oscillation.

ROLLAND S. TROTT.
BENJAMIN A. SWENNES.
KAY MILLER.